June 4, 1957  R. E. BRIGGS  2,794,776
WATER PURIFICATION PROCESS
Filed March 16, 1954  2 Sheets-Sheet 1

INVENTOR
ROBERT E. BRIGGS

BY Bacon & Thomas

ATTORNEYS

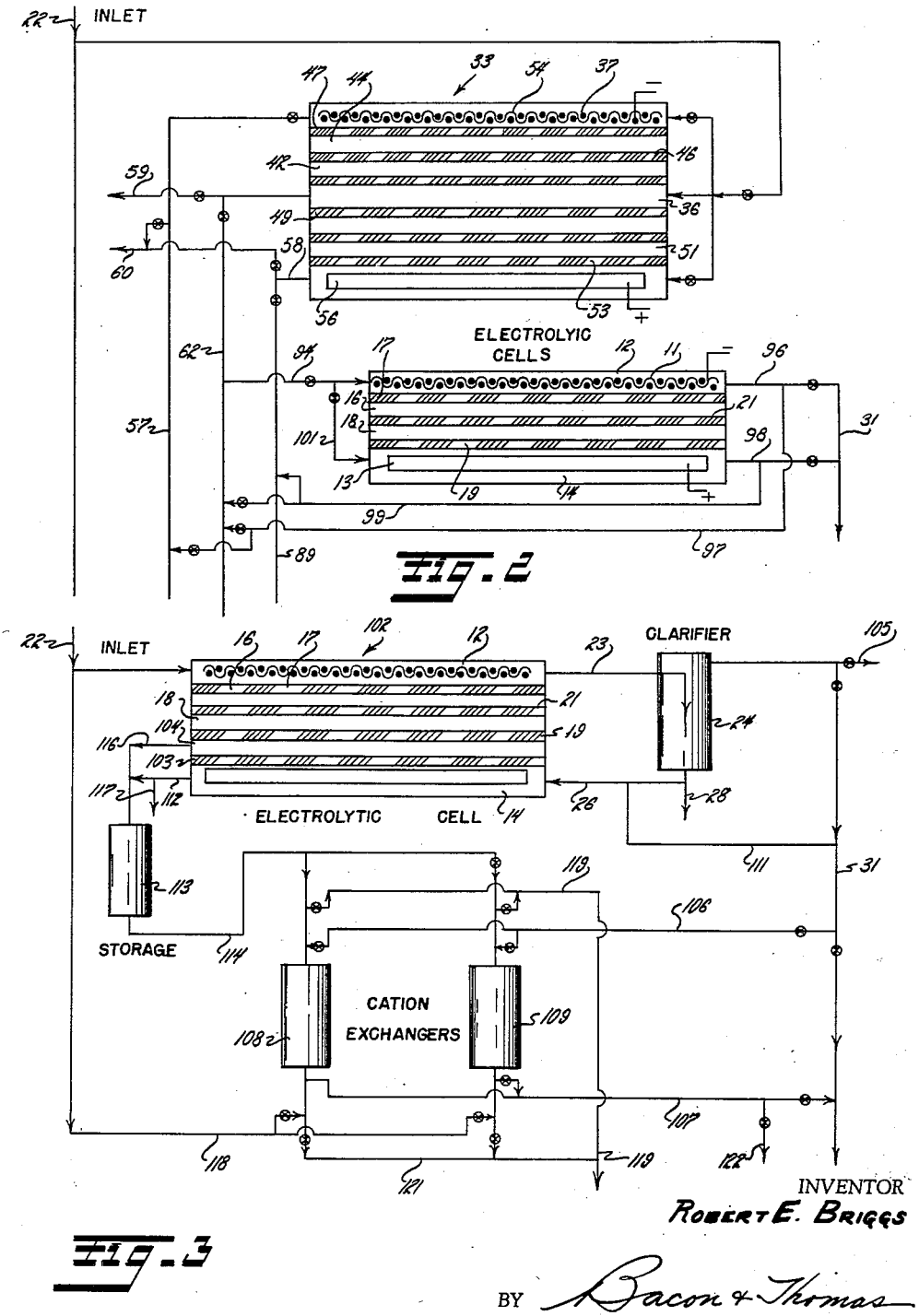

United States Patent Office 2,794,776
Patented June 4, 1957

2,794,776

WATER PURIFICATION PROCESS

Robert E. Briggs, Azusa, Calif.

Application March 16, 1954, Serial No. 416,492

23 Claims. (Cl. 204—151)

This invention relates to water treatment, and more particularly, to an improved process for removal of dissolved electrolytes from raw supply waters or process waste waters.

The invention involves three different types of water purification step; i. e., water softening by an improved electrolytic treatment, demineralization of water also by improved electrolytic treatment, and partial or substantially complete demineralization by a combination of electrolytic treatment and ion exchange with ion exchange materials which can be regenerated with electrolyte solutions produced by the electrolytic cells employed. The two types of electrolytic treatment may be employed either by themselves or in combination and, when used in combination, the sequence of treatment may be varied in accordance with the nature of the water being treated and the nature of the desired treated water. Ion exchange treatment is always preceded by one or the other of the electrolytic treatments or a combination thereof in order to provide regenerating solutions for the ion exchange materials.

The invention thus involves two basic features, that is, provision of an improved method of electrolytic treatment and the provision of a commercially successful method of water treatment utilizing ion exchange materials in combination with an electrolytic process.

While the literature is replete with electrolytic and ion exchange methods of demineralizing water, even to the alleged extent of completely demineralizing sea water, these processes have thus far amounted to mere theoretical postulations or to extremely small laboratory experiments, none of which were at all satisfactory on a commercial scale. The reasons behind the commercial impracticality of such previous attempts of water purification have lain in both the nature of the electrolytic treatment and in the manner in which the ion exchange materials have been used.

Two compartment electrolytic cells, wherein the water being treated is passed through a cathode compartment separated from an anode compartment by a single diaphragm, have been proven practical for softening waters containing carbonate hardness since the catholyte becomes sufficiently alkaline (10.5 to 11.5 pH) to precipitate such materials as calcium and magnesium as carbonates or hydroxides insoluble in the alkaline catholyte. In such a cell, the treated water has its acid constituents such as sulfate and chloride, somewhat reduced by ion migration into the anolyte. At the same time, however, there is some migration of alkaline metal cations, such as sodium and potassium ions from anolyte to catholyte so that the net reduction of total dissolved solids is commensurate with the amount of hardness constituents precipitated and removed and is seldom over 30% of that contained in the raw water. The alkaline catholyte, after a clarification step for substantial removal of the precipitate therefrom, may be subjected to further treatment in the anode compartment of an electrolytic cell for pH reduction, but the total dissolved solids content will not be materially changed.

It should be noted that the catholyte in this case is the main flow volume and is the useful product. Anolyte will, in general, have a pH above two and a total dissolved solids content approximately four times that of the catholyte. It is usually a waste product since the presence of suspended matter, relatively high dissolved salt content, and relatively low acid content tend to render it useless as a reagent in further treatment of the water. Unless the anolyte and catholyte are intermittently or continuously sent to waste and replaced with fresh solution, the cell rapidly reaches a condition under which the electric current through the cell is largely ineffective current.

Three compartment electrolytic cells have been employed to remove electrolyte from water in a process known as demineralization. With these cells, the water to be treated is passed through the middle compartment, which is separated from an anode compartment and a cathode compartment by a porous or permeable diaphragm on each side of the middle compartment. The demineralization is effected by ion migration from the middle compartment into the two outside anode and cathode compartments. To obtain substantial demineralization the water must be passed through a plurality of these cells in series. When conventional diaphragms are used the electrolyte concentrations in the anolyte and the catholyte compartments cannot normally be maintained greater than about five times the concentration in the middle compartment due to back diffusion and other reverse electrolytic action, and this limits the amount of demineralization which can be accomplished in a single cell. The quantities of slightly acid anolyte and slightly alkaline catholyte sent to waste from a plurality of such cells operated in series, as well as the amount of electric power required, have been so excessive as to make the process unattractive for general use. The quality of both anolyte and catholyte is such that they have no practical use for much the same reason as discussed above with reference to the anolyte from a two compartment cell.

The prevention of back diffusion and other reverse electrolytic actions in both two and three compartment electrolytic cells is thus a problem of long standing and of major importance. Many attempts have been made at its solution. Possibly the most common proposed solution has been the setting up of countercurrent flows of liquids which are intended to physically remove the ions and molecules which have any tendency to diffuse back through the separating diaphragm. These countercurrents have been composed of various liquids ranging from raw water influent to distilled water, and have been of various hydrogen ion concentrations, ranging from water having its hydrogen ion concentration unaltered to water having added buffer salts.

The use of distilled wash water for such countercurrents is obviously commercially impractical since the cost of providing such water would in most instances be of a magnitude to rival the cost of purifying the raw water to be treated. The use of countercurrents of raw water is likewise impractical from a commercial standpoint since even the cost of that water, which must be sent to waste, raises the water purification cost out of the practical range. The use of buffer salts to maintain the pH of the water in the various compartments of old cells at a constant value entails the expense of providing sufficient buffer salts and further results in a large pH gradient at the anode and cathode compartment diaphragms. This large pH gradient itself brings about many of the unwanted back diffusion and reverse electrolytic effects.

A further attempt at preventing back diffusion and reverse electrolytic effects has involved the use of additional electrolyte compartments on the outside of the anode and cathode compartments. Additional electrodes are provided in these outermost compartments and the connections are so arranged that back diffusion is retarded through the use of currents which carry the ordinarily back diffusing ions away from the central of demineralizing compartment or away from the electrode compartment to which they would normally migrate. While this prevents the flow of ineffective current in the central demineralizing compartment or between the main electrode compartments, the current flow to the extra electrodes is ineffective from demineralizing standpoint and is highly uneconomical. The result is an overall demineralizing efficiency too low to be practical.

The operation costs of conventional ion exchange processes are comprised of three items which are, in order of magnitude; the cost of regenerating chemicals, the cost of replacement of ion exchange material which is lost due to attrition, and the cost of back-wash water. These three cost items have thus far been so substantial that, when coupled with a high initial installation cost, they have practically prohibited the use of conventional ion exchange processes on a commercial scale in the treatment or purification of water.

The regenerating chemicals used in conventional ion exchange processes have normally consisted of acids and alkalies at concentrations ranging from 2 to 10 or 12%. Prior investigations have always shown that concentrations below about 2% were of such a low regenerating efficiency as to be impractical. See Industrial and Engineering Chemistry, September 1941, pages 1203–1212, volume 33, No. 9. The optimum concentrations of the cation and anion exchange resin regenerating solutions were believed to be 4% and 2% respectively. The regenerating chemicals are almost universally obtained by purchasing normal commercial grade acids and alkalies at the very high concentrations at which they are normally marketed and these are then adjusted to the desired concentration by dilution with the available supply of water.

In accordance with the present invention, there is provided a water treating process in which improved electrolytic cells are utilized alone or in combination with ion exchange materials at very high efficiencies. The electrolytic cells alone are capable of softening and demineralizing the water at a cost considerably below that previously thought possible, while the combination of electrolytic cells and ion exchange resins is capable of substantially completely demineralizing water at a cost which is but a fraction of that entailed in either the conventional electrolytic processes or the conventional ion exchange processes.

The improved electrolytic cells of the present invention have the usual anode and cathode compartments, but in addition have at least one and usually two or more additional compartments between the anode and cathode compartments or between these compartments and a middle demineralizing compartment to provide at least one and usually two or more quiescent barrier or buffer zones in which there is little or no solution flow or replacement of solution. These buffer compartments are provided by employing one or more additional porous or permeable diaphragms separating the various compartments from each other. The buffer compartments ordinarily have no outlets, at least under operating conditions, and may have no inlets if the diaphragms employed are sufficiently porous that seepage of solution therethrough will maintain a desired solution level in the buffer compartment. No waste of solution from such buffer compartments is required in most cases such that their use does not increase the solution loss from the process. On the contrary, their use decreases the loss of solution being treated in the process since much higher differences in electrolyte concentrations between the solutions in the anode and cathode compartments or between the solutions in a middle demineralizing compartment and in the anode and cathode compartments can be obtained before the cell reaches the condition where the electric current is largely ineffective. That is to say, the employment of a buffer compartment or buffer compartments makes possible a greater production of usable effluent and a lower production of waste effluent by reducing back diffusion and other reverse actions between or among the separated electrolytes.

The word buffer is utilized herein in the sense of a cushioning or shock absorbing medium and it is believed that the unexpected and advantageous effects of utilizing such buffer compartments are due to solution junction effects. The theory is that ions migrating under electrolytic influence and passing from a solution of one concentration to a second solution of another concentration are retarded in velocity at the point of solution junction. The electrolytic cells of this invention provide a means of exploiting this effect by providing quiescent solutions in barrier or buffer zones so as to effect a damping effect on the movement of hydrogen ions away from the anode.

In further accordance with the present invention there is provided a water treating process in which electrolytic cells of the improved type are utilized in combination with ion exchange materials so that both elements of the combination operate at their highest efficiency and in such a manner that the electrolytic cells produce effluents which are usable to regenerate the ion exchange materials. While the regenerating solutions produced by the improved electrolytic cells possess a concentration higher than that previously obtainable in electrolytic cells of similar type, these solutions nevertheless possess concentrations far below those previously thought necessary for use in regenerating ion exchange materials. The regenerating solutions produced are further of such a nature that the efficiency with which they regenerate ion exchange materials is far above that which previously has been thought possible.

It is a further discovery of the invention that the attrition loss which occurs in the normal use of ion exchange materials is roughly a function of the concentration of the regenerating chemicals and that when the ion exchange materials are regenerated according to the process of this invention the attrition loss is reduced to a negligible fraction of that obtained in previous operation. It has also been found that when the regenerating solutions produced according to the invention are utilized to regenerate ion exchange materials the amount of rinse necessary is materially reduced. It will thus be clear that the expense of demineralization by means of the process of this invention is merely a fraction of that obtained in any previous water purification process utilizing either electrolytic cells or ion exchange material.

When water is demineralized according to the invention water treatment cost is reduced in three distinct items; these being, the cost of the regenerating chemicals, the cost of rinse water, and the cost of replacement ion exchange material to make up attrition losses. The cost of regenerating chemicals is completely eliminated, the cost of make-up ion exchange material is drastically reduced, while the cost of rinse water is considerably reduced. The result is a water treatment process which is capable of substantially completely demineralizing water at a cost previously unheard of.

A further advantage of the combined process utilizing electrolytic cells and ion exchange materials is that electrolytic cells are particularly effective when employed to remove a considerable portion of the dissolved electrolyte from a water at high concentration, the cells becoming increasingly inefficient as the treated water approaches a low dissolved electrolyte content. On the other hand, ion exchange materials are particularly effective when employed to treat waters of relatively low electrolyte content and can produce a substantially demineralized water. The combination of the two demineralizing devices in the manner of the invention results in each being utilized in its most efficient manner to produce treated water at a minimum of expense. By blending waters from the various steps of the process, a final treated water may be obtained which is either acid, alkaline, or neutral and in which the most objectionable ingredients have been selectively reduced or the less harmful materials selectively retained. That is to say, for many purposes, a water containing a substantial amount of dissolved electrolyte may not be objectionable, or may even be desirable for a particular purpose. The method of the invention provides a process which can be used to yield waters having any predetermined characteristics.

It is, therefore, an object of the present invention to provide an improved water treating process by which raw waters or waste waters containing dissolved electrolyte may be efficiently treated to remove a desired portion or substantially all of the electrolyte.

Another object of the present invention is to provide a water treating process in which an improved electrolytic treatment or a combination of electrolytic treatments are employed to efficiently reduce the dissolved electrolyte content of the water.

A further object of the invention is to provide a water treating process in which electrolytic treatment is employed to initially remove a substantial amount of dissolved electrolyte from water and an ion exchange treatment is employed to further reduce the amount of dissolved electrolyte while at the same time, the by-products of the electrolytic treatment are employed as regenerants for the ion exchange materials.

A still further object of the invention is to provide an electrolytic process utilizing an improved electrolytic cell of the diaphragm type in which much greater differences in electrolyte concentration in the various compartments may be efficiently obtained.

A further object of the invention is to provide a water treatment process utilizing an electrolytic cell of the diaphragm type in which one or more quiescent zones of electrolyte are maintained between the anode and cathode compartments in order to permit efficient operation of the cell with increased differences in electrolyte concentration between the treating compartment and the anode and cathode compartment.

Other objects and advantages of the invention will appear in the following description taken in connection with the attached drawings, of which:

Figure 2 is a schematic diagram of a water treating system showing a modification of the electrolytic cell arrangement of Figure 1; and Figure 3 is a schematic diagram showing a modified water treating system.

Figure 1:
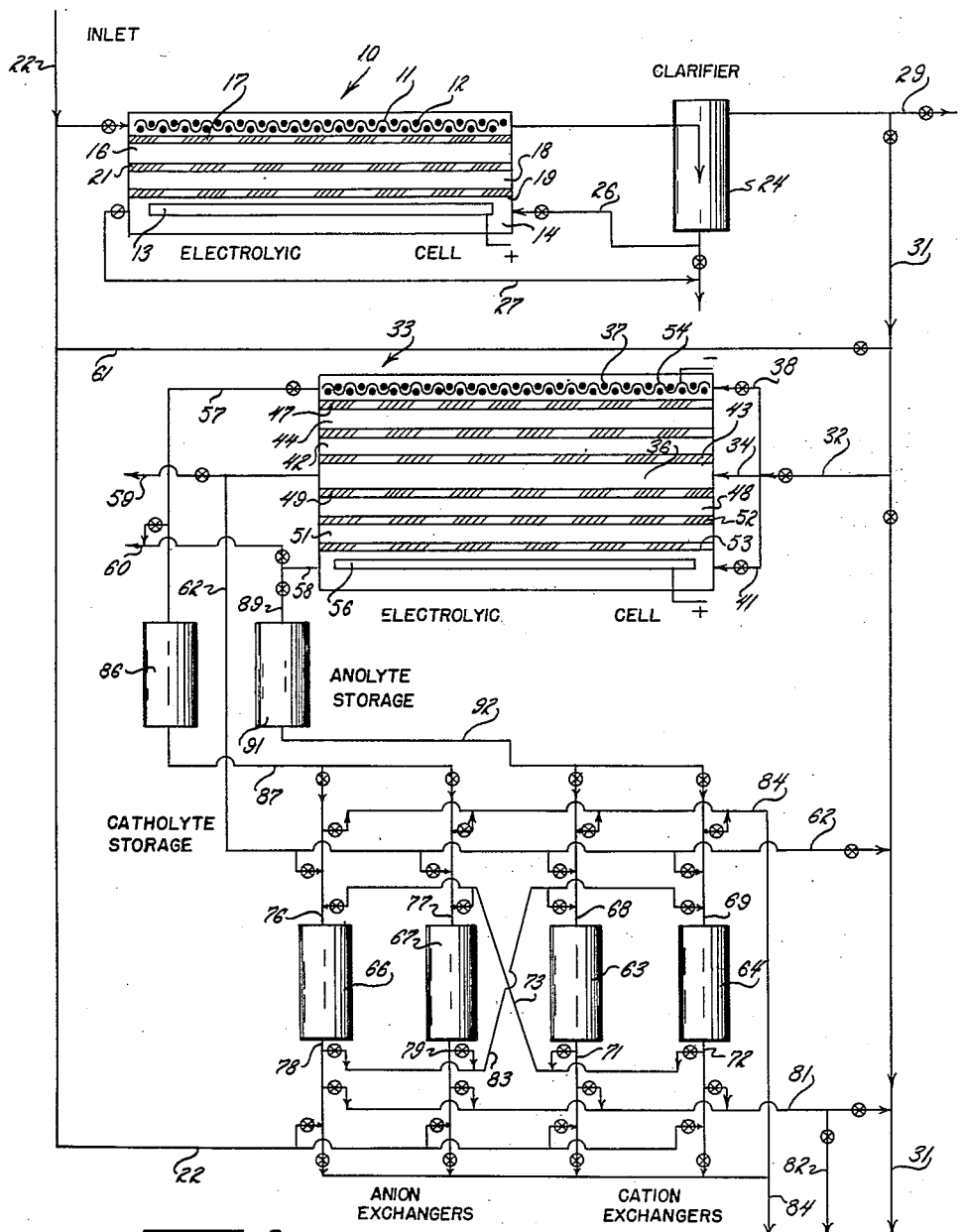
Figure 1 is a schematic diagram of a water treating system.

Referring more particularly to Figure 1 of the drawings, the system of Figure 1 may include a multiple-compartment electrolytic cell 10 provided with a cathode 11 positioned in an outside cathode compartment 12 and an anode 13 positioned in an outside anode compartment 14. The cathode compartment may be separated from a buffer compartment 16 by a diaphragm 17 near the cathode and the anode compartment may be separated from a buffer compartment 18 by another diaphragm 19 near the anode with a third diaphragm 21 placed between the other two diaphragms so as to separate the two buffer compartments 16 and 18 from each other. The diaphragms may be of any suitable porous or permeable material, heavy canvas or synthetic textile fabrics, such as fabrics of polyvinyl chloride fibers, being ordinarily employed. The cathode 11 may be of any suitable electrically conducting material which is not attacked by alkalies, for example, iron, iron hardware cloth or such materials as compressed carbon or graphite. The anode may be of any suitable material which is not attacked by acids, usually being compressed carbon or graphite and preferably immediately surrounded by a protective cover of acid resistant fabric, such as cloth woven from polyvinyl chloride fibers (not shown). During a water treating operation the cathode 11 is connected to the negative terminal of a suitable source of direct current and the anode 13 to the positive terminal of such source.

The water to be treated may be introduced directly into the cathode compartment 12 of the cell 10 from the supply line 22 and the alkalized effluent conducted through a pipe 23 into a clarifier 24. A portion of the cathodized water and all or a portion of the sludge collecting in the bottom of the clarifier 24 may be used as feed to the anode compartment 14 of the cell 10 through the pipe 26 to form the anolyte therein. The supply of water or electrolyte solution to the two buffer compartments 16 and 18 may be by seepage through the diaphragms separating these compartments from the anode and cathode compartments and from each other, and if after initial filling of the buffer compartments with water this seepage does not maintain the level in these compartments substantially the same as that in the anode and cathode compartments, one or more small apertures (not shown) may be formed in the respective diaphragms. Ordinarily no solution is withdrawn from the buffer compartments and seepage of water through their bounding diaphragms is adequate. The use of the alkaline water and the alkaline sludge as the feed to the anode compartment 14, as disclosed in my Patent Number 2,535,035, granted December 26, 1950, has been found to be effective in maintaining the hydrogen ion concentration within high efficiency limits while at the same time materially reducing the quantity of anolyte which it is necessary to discharge from a conventional two-compartment cell. Employment of the multiple-compartment cell as shown in the drawing with two or more buffer compartments makes possible a still further reduction of the amount of anolyte discharged by reducing back-diffusion tendencies. This feature may be particularly advantageous in case the sulfate content of the raw water is high and it becomes desirable to precipitate calcium sulfate from the anolyte. In my patent referred to above, disclosing the employment of a two-compartment electrolytic cell for water softening, it has been pointed out that maintaining the hydrogen ion concentration above approximately 2 pH for the anolyte has been important. With the multiple-compartment cell of the present invention, a lower pH limit is usually practical but, in general, the same principle of controlling the hydrogen ion as a current carrier should be applied. Since the anolyte from a water softening cell used in this manner is considerably fouled by high concentrations of dissolved salts and of insoluble precipitate or sediment, it has little or no value as an acid reagent and is therefore allowed to discharge to waste through the pipe 27 which joins the pipe 28 provided to discharge excess sludge from the clarifier 24.

In Figure 1, the combination of the cell 10 and clarifier 24 is therefore a water softening unit employing a multiple compartment cell to improve electrolytic efficiency. Removal of the hardness ingredient of the water is similar to that in a two-compartment cell but is obtained at greater efficiency. That is, for a water having a hardness dominantly calcium bicarbonate, raising the pH in the cathode compartment by electrolytic action to about 10.5 will bring about a substantial precipitation of calcium carbonate. Iron, manganese and silica content may also be reduced within this pH range, but if magnesium is present in quantity, elevation of the pH to 11.2 to 11.5 may be necessary to obtain the degree of softness desired. As an example of improved electrical efficiency, a water requiring approximately 0.8 of an ampere hour per gallon of flow through the cathode compartment to produce a desired softening effect in a two-compartment cell may be softened to the same degree with 0.5 of an ampere hour per gallon employing the multiple-compartment cell. Furthermore, total dissolved electrolyte in the effluent from the clarifier 24 will be less than when employing the two-compartment cell or any conventional and competitive water softening process. For certain purposes, the alkaline softened water may be withdrawn through the line 29. It must be taken into account, however, that when the incoming raw water is high in dissolved electrolyte other than hardness constituents which can be precipitated by alkalization, further treatment may not only be desirable but necessary to render the water useful for the desired purpose. The water softening step, however, conditions the water for such further treatment by reducing the amount of dissolved electrolyte and removing constituents which interfere with the efficient further removal of dissolved electrolyte.

To provide for further reduction of dissolved solids, commonly referred to as demineralization, diversion of all or part of the effluent from the clarifier 24 may be made through pipes 31 and 32 to a multiple-compartment cell 33. The main flow to the cell 33 is introduced through the pipe 34 to the centrally located demineralizing compartment 36. The cathode compartment 37 may be supplied through the pipe 38 and, in a similar manner, the anode compartment 39 may be supplied through the pipe 41. The demineralizing compartment 36 may be separated from a first catholyte buffer compartment 42 by a permeable diaphragm 43 which buffer compartment may be separated from a second catholyte buffer compartment 44 by another permeable diaphragm 46. The second catholyte buffer compartment may be in turn separated from the cathode compartment 37 by another permeable diaphragm 47. Similarly, the demineralizing compartment 36 may be separated from a first anolyte buffer compartment 48 by a permeable diaphragm 49 and the first anolyte buffer compartment may be separated from a second anolyte buffer compartment 51 by another permeable diaphragm 52, the second anolyte buffer compartment being separated from the anode compartment 39 by another permeable diaphragm 53.

The supply of water to the catholyte buffer compartments 42 and 44 may be by seepage through the diaphragms 47 and 46 or, conversely, through the diaphragms 43 and 46 and, similarly, the supply of water to the anolyte buffer compartments 48 and 51 may be by seepage through the diaphragms 53 and 52 or, conversely, through the diaphragms 49 and 52. Another arrangement for a general supply to all compartments of the cell 33, and particularly applicable when diaphragms are used that have a high resistance to seepage, is to have small apertures (not shown) in all or the required diaphragms so as to interconnect the various compartments to maintain a common liquid level in all compartments and a single main inlet conduit 34. Still other compartment inlet arrangements are possible and may employ a combination of the two principles cited but the general electrolytic effects of the cell will not be materially altered. These electrolytic effects are dominantly that of movement of cations toward a cathode 54 positioned in the cathode compartment 37 and movement of anions toward an anode 56 positioned in the anode compartment 39 when direct electric current is supplied to the cell 33 by connecting the negative terminal of a suitable source of electric power to the cathode 54 and the positive terminal to the anode 56. The result is a tendency toward depletion of electrolyte dissolved in the water within the demineralizing compartment 36, a relatively high concentration of alkaline cations within the cathode compartment 37 and a relatively high concentration of acidic anions within the anode compartment 39, the alkaline cations in the cathode compartment being balanced by hydroxyl anions and the acidic anions in the anode compartment being balanced by hydrogen cations. The concentration of alkaline cations within the buffer compartment 44 will be somewhat less than the concentration of cations in the cathode compartment 37. Similarly, the concentration of alkaline cations in the buffer compartment 42 will be less than the alkaline cation concentration in the buffer compartment 44 and more than the concentration in the demineralizing compartment 36. This condition will persist if some of the concentrated catholyte is intermittently or continuously withdrawn from the cathode compartment 37 through the outlet pipe 57. In like manner, acidic anion concentrations increase progressively from the deionizing compartment 36 through the anolyte buffer compartments 48 and 51 to the anode compartment 39 when intermittent or continuous withdrawal of the relatively concentrated anolyte is provided through the outlet pipe 58.

Substantially all cations of the group causing hardness in the water may be removed by the electrolytic treatment in the preceding cell 10, leaving only such cations as sodium and potassium or both, which form no insoluble precipitate when balanced by hydroxyl anions produced by electrolytic action at the cathode 54. The catholyte effluent, therefore, is a clear alkaline solution, which is usually predominantly sodium hydroxide. This effluent may be maintained at a pH above 12 by employing a cell of the type of the cell 33 and has been found suitable for regeneration of ion exchange materials. The anolyte discharged from the anolyte compartment may also be employed as a regenerating solution for ion exchange materials. Removal of hardness constituents, particularly calcium cations, is also important when the anolyte discharged from the cell is to be used as a regenerating agent since any formation of calcium sulphate precipitate would tend to render the anolyte unsuitable for that purpose. In this process, the anolyte discharged from the cell 33 is usually a mixture of sulphuric and hydrochloric acid and may be maintained at a pH below approximately 2 to render it suitable for regenerating cation exchange materials.

The number of buffer compartments on each side of the demineralizing compartment 36 and the electrolyte content of the supply water affect the concentration of both the anolyte and the catholye discharged from the cell. Increasing the number of buffer compartments, particularly if accompanied by higher electrolyte content in the supply water, makes possible higher concentration of the acid and the alkali produced by the electrolytic cell. With conventional electrolytic cells without buffer compartments the ratio of the concentration of electrolyte in the electrode compartments to the concentration of electrolyte in the demineralizing compartment could not ordinarily exceed a value of approximately 5 to 1.

As an example of the concentration ratios which might be obtained when buffer compartments are utilized, it was found in demineralizing a specific raw water that with one buffer compartment a ratio of approximately 9 to 1 between the concentration in the electrode compartment and the concentration in the demineralizing compartment could be satisfactorily used. Where two buffer compartments are utilized this ratio is increased to approximately 12 to 1, and where three compartments are used the ratio becomes approximately 14 to 1. One buffer compartment, of course, refers to one buffer compartment between the demineralizing compartment and the respective electrode compartment being referred to, so that, where it is desired to achieve the foregoing ratio between each electrode compartment and the demineralizing compartment it is necessary to provide a buffer compartment between each electrode compartment and the demineralizing compartment. This also applies to those situations where two and three buffer compartments are referred to. The foregoing concentration figures were obtained with a specific water and are subject to variation with waters of varying electrolyte content.

As the number of buffer compartments is increased the current efficiency of the cell increases, there being an increase from a 25% current efficiency in a three compartment cell with no buffer compartments to 75% in a similar cell having three buffer compartments on either side of the demineralizing compartment. Further increase in the number of buffer compartments causes an additional increase in current efficiency, the current efficiency asymptotically approaching 100%. While the current efficiency thus approaches 100% the power efficiency reaches a peak at approximately three buffer compartments and falls off beyond that due to increasing cell resistance.

While the width of the buffer compartments is not critical it has been found that a plurality of diaphragms in contact with one another are not effective. Under such circumstances proper diffusion and stabilization of the solutions in the buffer compartments is prevented and this results in localization of acidity or alkalinity in spots. The diaphragms forming the buffer compartment must therefore be spaced and as an example ½ of an inch was found satisfactory in a particular cell. If the spacing is too large the power efficiency is lowered due to increased cell resistance.

When the electric power (direct current) is applied to a filled cell as shown at 33, negatively charged ions (chloride, sulfate and the like) move toward the anode to form an acid anolyte and positively charged ions (sodium, potassium and the like) move toward the cathode to form an alkaline catholyte. At the same time, both types of ions tend to move out of the demineralizing compartment 36, depleting the electrolyte therein to produce at least a partially demineralized water. The pH of the solution in this compartment, or of the effluent therefrom, may vary over a considerable range. This pH may be varied and controlled to a certain extent by changing the amounts of anolyte or catholyte discharged from the respective compartments. For example, if the anolyte effluent through the pipe 58 is increased in volume, a lower concentration of hydrogen ion in the anode compartment 39 will result. There will be less hydrogen ion migration toward and into the diminieralizing compartment 36 and the pH of that effluent can be maintained above 7. Catholyte concentration also influences the pH of the pH of the demineralized effluent can be maintained below 7. Catholyte concentration also influences the pH of the effluent from the demineralizing compartment, but in this case it is the hydroxyl ion that becomes the effective ion. Both effects are somewhat limited by minimum volumes of anolyte and catholyte which are necessary to give the desired demineralization in the demineralizing compartment 36, and by the maximum volume economically permissable in practice.

Similar pH control is possible in conventional three compartment cells which do not have buffer compartments. However, the combined volumes of anolyte and catholyte effluent will usually be over 50% of the total influent to the cell and the demineralization obtainable in the middle compartment will be less than 50%. In contrast, use of the buffer compartments shown in the cell 33 makes possible a total quantity of anolyte and catholyte effluents which is less than 40% of the total influent to the cell, and a possible reduction of salt content in the demineralizing compartment effluent of 75% or more.

Generally speaking, the hydrogen ion concentrations which may be satisfactorily utilized in a cell of the type shown at 33 in Figure 2 may have the following approximate values; 1.4–1.5 in the anode compartment, 1.5–1.6 in the buffer compartment next to the anode compartment, 1.9 in the central buffer compartment, 2.0–2.5 in the buffer compartment next to the demineralizing compartment, 3.5–4.0 in the demineralizing compartment, 11.3–11.7 in the buffer compartment next to the demineralizing compartment, 12 in the central buffer compartment, 12.3–12.5 in the buffer compartment next to the cathode compartment, and 12.5–12.8 in the cathode compartment. The acidities and alkalinities which may be obtained where fewer buffer compartments are utilized are similar and may be opproximated by eliminating the outermost compartments in the foregoing series in pairs. Thus, for instance, in a three compartment cell utilizing no buffer compartments the pH values might be approximately 2.0–2.5 in the anode compartment, 3.5–4.0 in the demineralizing compartment, and the 11.3–11.7 in the cathode compartment. Again where a cell contained one buffer compartment on either side of the demineralizing compartment the approximate pH values might be 1.9 in the anode compartment, 2.0–2.5 in the buffer compartment next to the anode compartment 3.5–4.0 in the demineralizing compartment, 11.3–11.7 in the buffer compartment next to the cathode compartment, and approximately 12 in the cathode compartment. The foregoing figures are accurate where the raw water has a pH of approximately 7.5 to 8.5 and where the anolyte and catholyte flows are approximately equal.

In general, when utilizing the system shown in Figure 1, the treated water discharged from the demineralizing compartment 36 will be held to a pH of 7 or slightly above for most purposes, and the dissolved electrolyte content with reference to the water supplied to the cell 33 will have been reduced 60 to 70 percent. In some instances, the thus partially demineralized water is suitable for a desired use and may be withdrawn, all or in part, through the pipe 59, in which case all or part of the anolyte and catholyte from the cell 33 can be discharged from the process through the pipe 60. When all of the treated water is thus withdrawn from the process, all of the anolyte and catholyte are discharged to waste and the process is a two-stage electrolytic demineralizing treatment in which softening of a hard water, accompained by a limited reduction of dissolved electrolyte, in a type of electrolytic cell which produces an alkaline effluent is followed by another type of electrolytic cell which further reduces the dissolved electrolyte content and at the same time adjusts the pH to a desired point. It is also apparent that if the supply water is originally soft, the water softening cell 10 and clarifier 24 may be omitted and water fed directly from the inlet pipe 22 through the pipe 61 and the pipes 31 and 32 to the cell 33 as is shown in Figure 2.

Many industrial processes require a finished water of higher purity than that produced by the combination of electrolytic treatments in the cells 10 and 33 or, in the case of soft water, in the cell 33, when electric power input is kept within economic bounds. Provision has therefore been made in Figure 1 for delivery of all or a part of the partially demineralized effluent from the compartment 36 of the cell 33 through the pipe 62 to an ion exchange system which may include two cation exchangers 63 and 64 and two anion exchangers 66 and 67. The system for the ion exchangers is arranged so that one cation exchanger and one anion exchanger may be operated on an exhaustion cycle while the other cation exchanger and the other anion exchanger are being backwashed, regenerated and rinsed. This is important since reaction time is a considerable factor in the regenerating steps when the relatively dilute acid and alkali produced by the electrolytic cell 33 are to be used as regenerating agents. Storage tanks of sufficient size might be installed for collecting and holding these solutions so as to enable a single cation and a single anion exchanger to be used, but since considerable volumes are involved and the time factor still remains, the double system will generally be preferred. While some of the older ion exchange materials will not operate quite satisfactorily in this process, those presently in use are in general effective. Thus, strongly basic amine-type anion exchange resins such as the Amberlite resins IRA 400 and IRA 410 are satisfactory. Both of these resins may be regarded as solid insoluble caustics and the IRA 410 resin is not quite so basic as IRA 400 and consequently may be regenerated with a somewhat higher efficiency. In addition to these strongly basic anion exchange resins it is also possible to use weakly basic anion exchange resins such as the Amberlite resin IR 45. As cation exchange resins the sulfonic acid type of medium capacity such as Amberlite IR 112 is satisfactory as is the high capacity nuclear sulphonic acid type such as Amberlite IR 120. An additional resin which is highly satisfactory is the unifunctional type having slightly ionized carboxylic acid groups as the sole active exchange centers, such as the Amberlite resin IRC 50. Of the foregoing resins the preferred types are the strongly basic, amine-type anion exchange resins, such as Amberlite IRA 410, and the unifunctional resins having slightly ionized carboxylic acid groups, such as Amberlite IRC 50.

The system has been arranged so that flow of the water to be treated may be directed first to an anion exchanger and then through a cation exchanger, or first through a cation exchanger and then through an anion exchanger, the latter conforming to the generally accepted technique for water demineralizing when strong acids and alkalies are used as regenerants. It has been found, however, that better performance is often obtained when weak regenerants are used by first passing the water through an anion exchanger and then through a cation exchanger, particularly when the pH of the effluent from the cell 33 is slightly acid.

While it has been generally believed that the aforementioned resins had to be regenerated commercially by means of solutions ranging in concentration from 2 to 10 or 12%; according to the invention these resins are efficiently regenerated with regenerating solutions of much lower concentrations. Thus while the literature (Industrial and Engineering Chemistry, September 1941, pp. 1203–1212, vol. 33, No. 9) has consistently pointed out that regenerating efficiencies fall off drastically below these percentages, it is a discovery of this invention that the dilute regenerating solutions produced according to the process of the invention are capable of regenerating the aforementioned ion exchange materials at efficiencies well above those which previous work would lead one to expect.

It is believed that the reason for this unexpected result lies in the particular composition of the regenerating solutions produced according to the process of the invention. Thus both the cation and anion regenerating solutions are depleted of mutivalent cations such as calcium and magnesium and the like which exercise a detrimental effect during regeneration. In addition, the catholyte or anion exchanger regenerating solution is depleted of such ions as sulphate and chloride which decrease the regenerating effectiveness of the hydroxyl ions, and the anolyte or cation exchanger solution is depleted of metallic ions such as sodium and potassium which decrease the regenerating effectiveness of the hydrogen ions. The regenerating solutions thus produced are thereby far superior to those obtained by diluting concentrated chemical regenerants with available water and are capable of unexpectedly high regenerating efficiencies. In general the concentrations of such regenerating solutions is below approximately 1%.

When ion exchange materials are regenerated with these dilute regenerating solutions the shock to the exchange materials which normally accompanies the use of conventional stronger acids and alkalies is eliminated and the attrition loss is thereby decimated, and this results in a substantial saving in water cost.

Returning to Figure 1 of the drawing it will be seen that the partly demineralized water may be delivered from the demineralizing compartment 36 of the cell 33 through the pipe 62 and one of the pipes 68 or 69 into one of the cation exchangers 63 or 64 while the other is being regenerated and otherwise conditioned for ion exchange operation. The water which has passed through a cation exchanger may be delivered to an anion exchanger 66 or 67 through one of the pipes 71 or 72, the pipe 73, and one of the pipes 76 or 77. The water which has been passed through an anion exchanger in this case may then be discharged from the process as pure product water through one of the pipes 78 or 79 and pipe 81 or 82. Alternatively, the partially demineralized water from demineralizing compartment 36 of the cell 33 may be passed through the pipe 62 and one of the pipes 76 and 77 into one of the anion exchangers 66 and 67. The water which has been passed through an anion exchanger in this case may be then delivered to a cation exchanger through one of the pipes 78 or 79, pipe 83, and one of the pipes 68 or 69. The water which has been passed through a cation exchanger may then be discharged from the process through one of the pipes 71 or 72, pipe 81 and pipe 82.

After exhaustion, any cation or anion exchanger is usually backwashed prior to regeneration. Backwash water may be supplied directly from the inlet pipe 22 into any of the pipes 78, 79, 71 or 72 connected to the lower portions of the ion exchangers 66, 67, 63 and 64, respectively. The backwash water passing through the various ion exchangers may be discharged to waste through any of the pipes 76, 77, 68 or 69 and pipe 84.

After a given ion exchanger is backwashed, it may be regenerated. Thus the alkaline catholyte from the cathode compartment 37 of the cell 33 may be delivered through the pipe 57 into a storage tank 86 and then through a pipe 87 and one of the pipes 76 or 77 into an anion exchanger 66 or 67 to be employed therein as a regenerating solution. The spent regenerating solution may be discharged to waste through one of the pipes 78 or 79, the pipe 88 and the pipe 84. Similarly, the acid anolyte from the anode compartment 39 of the cell 33 may be delivered through the pipes 58 into a storage tank 91 and then through a pipe 92 and one of the pipes 68 or 69 into a cation exchanger to be employed therein as a regenerating solution. The spent regenerating solution from the cation exchangers may be discharged to waste through one of the pipes 71 or 72, the pipe 88 and pipe 84. The storage tanks 86 and 91 may be small in size since they need merely accumulate catholyte or anolyte during a backwashing operation on one ion exchanger, which operation is a small portion of an ion exchange cycle. After regeneration, an ion exchanger is ordinarily rinsed with the water being treated and during this operation rinse water may be discharged to waste in the same manner as a spent regenerating solution.

Substantially completely demineralized water may be obtained from the outlet pipe 82 of the ion exchange system and, in general, the cell 33 can be operated to furnish enough regenerating solutions for regeneration of the ion exchangers when all of the water from the compartment 36 of the cell 33 is passed through the ion exchanger. This requires that the cell 33 remove somewhat more than 50% of the dissolved electrolyte from the water entering the cell in order to supply the necessary excess of regenerating solution. In general, however, completely demineralized water is not required and a portion of the water from the compartment 36 of the cell 33 can be by-passed around the ion exchangers to give any desired blend with any of the waters from the ion exchangers or water from the cell 10 and clarifier 24 or even water entering the process through the pipe 22. The system of Figure 1, therefore, also provides for a by-pass of all or a part of the partially demineralized water from the cell 33 through the pipe 62 to be blended with the alkaline softened water from cell 10 and clarifier 24 to produce an adjustable mixture which may be withdrawn through the pipe 31. Another blend may be obtained by proportioning desired amounts of the waters which can be delivered to the pipe 31 with the highly demineralized water from the ion exchange units delivered through the pipe 81 into the pipe 31. It is also possible to by-pass either the cation exchangers or the anion exchangers by sending water from the compartment 36 through one type of exchanger only in case one or the other of the ion exchangers (cation or anion) should not be required to give a desired water quality.

It is apparent that the invention provides for the removal from a water, which contains such quantities of dissolved electrolytes that it is unsuitable for a particular use, only that portion of the dissolved electrolyte necessary to render the water suitable for such use. The by-pass and blending arrangements shown provide for relieving the load on the ion exchangers and other water treating units to thus reduce the costs of the process. It is known that regenerating agents for ion exchange materials must be furnished in excess of the theoretical amount to accomplish the desired regeneration. If only 50% of the mineral content in the water entering the electrolytic cell 33 were converted to acid and alkali solutions, it is evident that the ion exchangers could not be regenerated with them to remove the remaining 50% in the treated water discharged from the compartment 36 of the cell 33. If 60 to 70% of the electrolyte content in this water is converted to acid and alkali solutions, regeneration and exhaustion cycles can be brought into balance. Although this balance can ordinarily be attained, it may be desirable, in some cases, to add additional acid and alkali from a source other than the electrolytic cell but, in general, the better practice is to blend a part of the treated water from the compartment 36 of the cell 33 with the water from the ion exchangers or divert it from the process, or a combination of both.

It is also possible to blend waters from the two types of ion exchangers with each other or with other water from the electrolytic cells. In general, it is usually desirable to produce a neutral or slightly alkaline water. For example, if the effluent from the compartment 36 of electrolytic demineralizing cell 33 is first directed through an anion exchanger, and then through a cation exchanger, the water produced will usually have a pH value below 5 and because of its corrosive nature will usually require a blending with some of the anion exchanger effluent or other alkaline water to bring the pH up to an acceptable value for distribution and use. When the flow is first directed through a cation exchanger and thence to an anion exchanger, the water produced will usually have a pH value between 9 and 11.5, depending upon the nature of the ion exchange material and the degree of regeneration accomplished. This alkaline water, low in dissolved salt content, will in most cases be acceptable as it is but in some instances may require pH reduction employing the blending of some of the cation exchanger effluent.

The importance of having a substantially soft water as influent to the demineralizing cell 33, particularly when the anolyte and the catholyte from the cell are to be used as regeneration agents, has been noted. In some instances, for example, when the water to be treated in the process contains only small quantities of alkali metal ions and considerable amounts of sulfate and chloride ions, a better balance of anolyte and catholyte solutions from the cell 33 may be obtained by using a zeolite ion exchanger to accomplish the softening of the water. Such zeolite softeners are known in the art and would then be substituted for the electrolytic softening system including the cell 10 and clarifier 24. Some waters requiring demineralization have little or no hardness constituents and when such are encountered, pre-softening may be entirely dispensed with and the raw water introduced directly to the electrolytic demineralizing cell 33 through the pipe 61 and pipes 31 and 32. Occasionally such a water can be rendered suitable for a particular use by treatment in the compartment 36 of the cell 33, in which case the anolyte and the catholyte from the cell 33 become waste products. The multiple-compartment electrolytic cell 33 then becomes an individual and complete water treating unit. More often, however, the ion exchangers employed in the manner previously described will be required or the modification shown in Figure 2 adopted.

An example of the operation of the process shown in Figure 1, two 1 and ¾ inch tubes, one containing a 27 inch depth of Amberlite IRC 50 ion exchange resin and the other an equivalent amount of Amberlite IRA 410 ion exchange resin, were operated in series with and following a two compartment cell such as 10 and a multi-compartment demineralization cell such as 33. Two sets of ion exchange units were utilized so that one might be regenerated while the other was in service. During op-

*Table 1*

| | | Synthetic Waste Water | Two-Compartment Electrolytic Unit | | Multi-Compartment Electrolytic Unit | | | Effluent From Ion Exchange Units |
|---|---|---|---|---|---|---|---|---|
| | | | Anolyte | Treated Water | Anolyte | Catholyte | Partially Demineralized Water | |
| Analysis: | | | | | | | | |
| Silica ($SiO_2$) | (p. p. m.) | 9 | | 6.8 | | | 6.3 | 1.7 |
| Calcium (Ca) | (p. p. m.) | 105 | | 8 | | | 4 | 1 |
| Magnesium (Mg) | (p. p. m.) | 30 | | 17 | | | 12 | 1 |
| Sodium (Na) | (p. p. m.) | 230 | | 275 | | | 149 | 9 |
| Potassium (K) | (p. p. m.) | 3 | | 4 | | | 1 | 0 |
| Hydrogen (H) | (p. p. m.) | 0 | 11.1 | 0 | 29.2 | | 0 | 0 |
| Carbonate ($CO_3$) | (p. p. m.) | 11 | | 120 | | 144 | 0 | 0 |
| Bicarbonate ($HCO_3$) | (p. p. m.) | 294 | | 34 | | | 129 | 5 |
| Sulfate ($SO_4$) | (p. p. m.) | 312 | | 223 | | | 134 | 5 |
| Chloride (Cl) | (p. p. m.) | 216 | 780 | 158 | 1,180 | 43 | 96 | 10 |
| Nitrate ($NO_3$) | (p. p. m.) | 0.4 | | 0.4 | | | 0.4 | 0.3 |
| Hydroxide (OH) | (p. p. m.) | 0 | | 0 | | 654 | 0 | 0 |
| Total Hardness (As $CaCO_3$) | (p. p. m.) | 386 | | 90 | | | 59 | 7 |
| Total Dissolved Solids | (p. p. m.) | 1,063 | | 829 | | | 467 | 30 |
| Alkalinity—Phenolph | (p. p. m.) | 9 | | 100 | | 2,044 | 0 | 0 |
| Alkalinity—Total | (p. p. m.) | 259 | | 228 | | 2,164 | 106 | 3 |
| Hydrogen Ion Conc.—pH | | 8.6 | 2.3 | 10.5 | 1.9 | 12.9 | 7.4 | 8.0 |
| Electrical Conductivity | ($EC \times 10^6$) | 1,724 | 4,521 | 1,379 | 9,931 | 9,710 | 816 | 58.4 |
| Operating Data: | | | | | | | | |
| Rate of Flow | (G. P. H.) | 1.49 | 0.48 | 1.01 | 0.18 | 0.18 | 0.65 | 0.65 |
| Recovery—Percent of Total Input | | | | 67.8 | | | | 43.6 |
| Current Input | (Amperes) | | | 1.6 | | | 1.5 | |
| Applied E. M. F. | (Volts) | | | 3.8 | | | 13.5 | |
| Amp. Hrs. Per Gal. Finished Water | | | | | | | | 4.77 |
| Electrode Area | (Sq. Ft.) | | | 1.9 | | | 1.5 | | eration, the water to be treated was flowed first through the cathode compartment of the two compartment cell 10 and then through the central or demineralizing compartment 36 of the demineralizing cell 33. The partially demineralized effluent from this central compartment was then passed first through an anion exchanger and then through a cation exchanger, emerging from the latter as a water suitable for almost all industrial applications. While demineralization of the water took place in one set of ion exchange units the acid anolyte from the demineralizing cell flowed through the second cation exchange unit to regenerate the ion exchange material retained therein and the catholyte similarly regenerated the anion exchange material in the other stand-by unit. The anolyte and catholyte were thus not wasted, but were utilized to further increase the demineralizing capacity of the system. Complete data on this use of the process is shown for two hard sewage waters in Tables 1 and 2.

*Table 2*

| | | Synthetic Waste Water | Two-Compartment Electrolytic Unit | | Multi-Compartment Electrolytic Unit | | | Effluent From Ion Exchange Units |
|---|---|---|---|---|---|---|---|---|
| | | | Anolyte | Treated Water | Anolyte | Catholyte | Partially Demineralized Water | |
| Analysis: | | | | | | | | |
| Silica ($SiO_2$) | (p. p. m.) | 9 | | 5.1 | | | 5.7 | 2.0 |
| Calcium (Ca) | (p. p. m.) | 74 | | 8 | | | 6 | 2 |
| Magnesium (Mg) | (p. p. m.) | 50 | | 11 | | | 10 | 1 |
| Sodium (Na) | (p. p. m.) | 366 | | 425 | | | 219 | 15 |
| Potassium (K) | (p. p. m.) | 4 | | 5 | | | 3 | 0 |
| Hydrogen (H) | (p. p. m.) | 0 | 11.5 | 0 | 43 | | 0 | 0 |
| Carbonate ($CO_3$) | (p. p. m.) | 2 | | 94 | | 374 | 0 | 0 |
| Bicarbonate ($HCO_3$) | (p. p. m.) | 177 | | 0 | | | 54 | 4 |
| Sulfate ($SO_4$) | (p. p. m.) | 298 | | 237 | | | 166 | 14 |
| Chloride (Cl) | (p. p. m.) | 520 | 1,320 | 380 | 2,200 | 30 | 255 | 16 |
| Nitrate ($NO_3$) | (p. p. m.) | 0.2 | | 0.2 | | | 0.2 | 0.3 |
| Hydroxide (OH) | (p. p. m.) | 0 | | 14 | | 952 | 0 | 0 |
| Total Hardness (As $CaCO_3$) | (p. p. m.) | 391 | | 65 | | 78 | 91 | 9 |
| Total Dissolved Solids | (p. p. m.) | 1,412 | | 1,179 | | | 692 | 49 |
| Alkalinity—Phenolph | (p. p. m.) | 2 | | 118 | | 3,112 | 0 | 0 |
| Alkalinity—Total | (p. p. m.) | 149 | | 196 | | 3,424 | 44 | 3 |
| Hydrogen Ion Conc.—pH | | 8.4 | 2.3 | 11.0 | 1.7 | 13.1 | 7.2 | 8.0 |
| Electrical Conductivity | ($EC \times 10^6$) | 2,430 | 5,572 | 2,280 | 14,130 | 14,130 | 1,265 | 110 |
| Operating Data: | | | | | | | | |
| Rate of Flow | (G. P. H.) | 1.478 | 0.514 | 0.964 | 0.166 | 0.164 | 0.634 | 0.634 |
| Recovery—Percent of Total Input | | | | 65.2 | | | | 42.8 |
| Current Input | (Amperes) | | | 1.35 | | | 2.15 | |
| Applied E. M. F. | (Volts) | | | 2.93 | | | 12.6 | |
| Amp. Hrs. Per Gal. Finished Water | | | | | | | | 5.52 |
| Electrode Area | (Sq. Ft.) | | | 1.9 | | | 1.5 | |

*Table 3*

| | | Softened Colorado River Water | Multi-Compartment Electrolytic Unit | | | Effluent From Ion Exchange Units |
|---|---|---|---|---|---|---|
| | | | Anolyte | Catholyte | Partially Demineralized Water | |
| Analysis: | | | | | | |
| Silica ($SiO_2$) | (p. p. m.) | 8 | | | 8 | 6.8 |
| Calcium (Ca) | (p. p. m.) | 1 | | | 1 | 1 |
| Magnesium (Mg) | (p. p. m.) | 1.5 | | | 1.5 | 1 |
| Sodium (Na) | (p. p. m.) | 238 | | | 154 | 10 |
| Potassium (K) | (p. p. m.) | 3 | | | 3 | 0 |
| Hydrogen (H) | (p. p. m.) | 0 | 21.5 | | 0 | 0 |
| Carbonate ($CO_3$) | (p. p. m.) | 2 | | 134 | 0 | 0 |
| Bicarbonate ($HCO_3$) | (p. p. m.) | 122 | | | 11 | 4 |
| Sulfate ($SO_4$) | (p. p. m.) | 294 | | | 241 | 8 |
| Chloride (Cl) | (p. p. m.) | 89 | 470 | 31 | 64 | 10 |
| Nitrate ($NO_3$) | (p. p. m.) | 0.3 | | | 0.4 | 0.4 |
| Hydroxide (OH) | (p. p. m.) | 0 | | 443 | 0 | 0 |
| Total Hardness (As $CaCO_3$) | (p. p. m.) | 9 | | | 9 | 7 |
| Total Dissolved Solids | (p. p. m.) | 698 | | | 478 | 39 |
| Alkalinity—Phenolph | (p. p. m.) | 2 | 0 | 1,416 | 0 | 0 |
| Alkalinity—Total | (p. p. m.) | 104 | 0 | 1,528 | 9 | 3 |
| Hydrogen Ion Conc.—pH | | 8.4 | 2.05 | 12.8 | 5.9 | 7.9 |
| Electrical Conductivity | ($E \times 10^6$) | 1,150 | 6,870 | 6,770 | 800 | 62 |
| Operating Data: | | | | | | |
| Rate of Flow | (G. P. H.) | 0.880 | 0.164 | 0.145 | 0.571 | 0.571 |
| Recovery—Percent of Total Input | | | | | 64.8 | 64.8 |
| Current Input | (Amperes) | | | | 0.75 | |
| Applied E. M. F. | (Volts) | | | | 15.5 | |
| Amp. Hrs. Per Gal. Finished Water | | | | | 1.31 | |
| Electrode Area | (Sq. Ft.) | | | | 1.5 | |

Table 4

| | | Garland, Texas, Water | Multi-Compartment Electrolytic Unit | | | Effluent From Ion Exchange Units |
|---|---|---|---|---|---|---|
| | | | Anolyte | Catholyte | Partially Demineralized Water | |
| Analysis: | | | | | | |
| Silica (SiO$_2$) | (p. p. m.) | 26 | | | 2.8 | 6.7 |
| Calcium (Ca) | (p. p. m.) | 5 | | | 3 | 1 |
| Magnesium (Mg) | (p. p. m.) | 1.5 | | | 1 | 0.5 |
| Sodium (Na) | (p. p. m.) | 424 | | | 147 | 10 |
| Potassium (K) | (p. p. m.) | 3 | | | 1 | 0 |
| Hydrogen (H) | (p. p. m.) | 0 | 14.6 | | | |
| Carbonate (CO$_3$) | (p. p. m.) | 14 | | 254 | 0 | 0 |
| Bicarbonate (HCO$_3$) | (p. p. m.) | 481 | | | 101 | 1 |
| Sulfate (SO$_4$) | (p. p. m.) | 370 | | | 163 | 7 |
| Chloride (Cl) | (p. p. m.) | 101 | 324 | 20 | 55 | 12 |
| Nitrate (NO$_3$) | (p. p. m.) | 0.3 | | | 0.3 | 0.1 |
| Hydroxide (OH) | (p. p. m.) | 0 | | 880 | | |
| Total Hardness (As CaCO$_3$) | (p. p. m.) | 19 | | | 12 | 4 |
| Total Dissolved Solids | (p. p. m.) | 1,162 | | | 424 | 38 |
| Alkalinity—Phenolph | (p. p. m.) | 12 | | 2,800 | 0 | 0 |
| Alkalinity—Total | (p. p. m.) | 418 | | 3,012 | 83 | 1 |
| Hydrogen Ion Conc.—pH | | 8.6 | 1.8 | 12.7 | 6.5 | 5.8 |
| Electrical Conductivity | (EX10$^6$) | 1,845 | 8,936 | 12,823 | 710 | 56 |
| Operating Data: | | | | | | |
| Rate of Flow | (G. P. H.) | 0.754 | 0.108 | 0.112 | 0.534 | 0.534 |
| Recovery—Percent of Total Input | | | | | 70.8 | 70.8 |
| Current Input | (Amperes) | | | | 1.4 | |
| Applied E. M. F. | (Volts) | | | | 10.0 | |
| Amp. Hrs. Per Gal. Finished Water | | | | | 2.62 | |
| Electrode Area | (Sq. Ft.) | | | | 1.5 | |

The water described in Table 1 was reduced in mineral content from 1063 p. p. m. to 30 p. p. m. in the three step process at an electricity consumption of 4.77 ampere hours per gallon of finished water. About 44% of the total input was recovered as fully processed water. The second sewage water, shown in Table 2, had an initial mineral content of 1412 p. p. m. which was reduced to 49 p. p. m. dissolved solid content by the same process. The quantity of electricity consumed for this treatment was 5.52 ampere hours per gallon of finished water and the recovery was about 43% of the input water. An appreciable increase in the percentage recovery of the processed water may be effected if the process is controlled to yield a finished water having a higher mineral content and with this type of operation the current requirement is obviously more favorable.

In addition to the foregoing operations soft water was also processed by means of a system such as is shown in Figure 1, but since the water was soft, the two compartment cell 10 was eliminated and the water was delivered directly to the demineralizing compartment 36 of the demineralizing cell 33, an ion exchanger arrangement similar to the preceding example being used. During operation, the raw water was divided among the central or demineralizing compartment and the electrode compartments of the cell 33, the rate of flow through each being dependent on the quality of the influent water and the degree of demineralization desired. The partially demineralized effluent from the center compartment was passed first through the anion exchanger and then through the cation exchanger, emerging from the latter as a water suitable for almost all industrial applications. The data obtained in treating this soft water is shown in Table 3. It will be observed that the dissolved solids were reduced by 31 percent in the electrolytic unit and that only about 6% of the original mineral constituents remained in the treated water after passage through the ion exchange columns. Almost 65% of the input water was recovered as a finished product, the remainder being passed through the anode and cathode compartments and forming the regenerants for the ion exchange resins. The quantity of electricity required, as shown in Table 3, was only 1.31 ampere hours per gallon of finished water. Even at the high voltage of 15.5 volts which was used this represents an energy consumption of only 20.3 kwh. per 1000 gallons. The unit may also be designed to permit operation at the desired flow rate with a voltage of 4 to 6 volts and this proportionately reduces the cost of operation.

A further example of the operation of the process on a soft water is detailed in Table 4. The demineralization shown was accomplished in a multi-compartment demineralizing cell such as cell 33 in Figure 1 which was followed by ion exchange resins of the same type as in the preceeding examples. As is shown in Table 4 the initial dissolved solids content of the water was 1162 p. p. m. This was reduced to 424 p. p. m. in the electroyltic cell and further reduced to 38 p. p. m. in the ion exchange unit. The electricity required for this process was 2.62 ampere hours per gallon. A unit might also be designed for comparable treatment at a voltage of 4 volts and at this voltage only 10.45 kwh. would be consumed per 1000 gallons of treated water. For the improvement in water quality achieved, this figure is quite attractive. The recovery of finished water was slightly better than 70% of the input water.

In the modification referred to, Figure 2, the water to be treated is originally a soft water and is introduced through the pipe 93 connected with the supply line 22 directly into a multiple-compartment cell 33 which may be the same as cell 33 of Figure 1. Influent and effluent connections as well as concentrations of discharged anolyte, catholyte and partially demineralized water are substantially the same as for the cell 33 of Figure 1 and, in general, the same reference numerals have been employed. The modification of Figure 2 is primarily concerned with pH adjustment of the effluent from the demineralizing compartment 36 of the cell 33. Although water softening equipment such as discussed with respect to Figure 1 may be employed ahead of the cell 33 of Figure 2, this figure will be discussed with respect to naturally soft water. The pH of a naturally soft water, although it may contain a considerable quantity of dissolved electroylte, will usually be within the range of 7 to 8.5 pH. There is an inherent tendency toward a drop in pH of the water within the demineralizing zone 36 of the cell 33 when it is worked at maximum electrical efficiency to remove dissolved electrolyte. The effluent from the compartment 36 therefore may be as low as 3.5 pH. Such a low pH water is of corrosive nature and not, in general, acceptable for use. It may therefore be flowed through the pipe 62 and the pipe 94 into the cathode compartment 12 of another electrolytic cell 10, which may be the same as cell 10 of Figure 1, for pH adjustment to any desired alkalinity, for example, 8.5 pH conforming to general practice. Such a partially demineralized water is suitable for many uses and may be, all or in part, withdrawn from the process through the pipes 96 and 31. If a further demineralized water is desired, it may be returned, all or in part, through the pipe 97 to the pipe 62 and subjected to further demineralization in the ion exchangers shown in Figure 1. In this case the acid anolyte from cell 10 may be delivered through the pipes 98 and 99 into the pipe 89 to supplement the cation exchanger regenerant produced by cell 33. It is conceivable that in some instances it may be desirable to have the water requiring further demineralization at a lower pH than that supplied from the demineralizing zone 36 of the cell 33 as it enters the anion exchanger. In that case, the main flow to the cell 10 is directed into the anode compartment 14 of the cell 10 through the pipes 62, 94 and 101. The pH may be reduced to the desired value, for example, between 2 and 2.7, and the treated water directed through the pipes 98 and 99 into the main ion exchanger supply line 62. The catholyte from the cell 10, under such an arrangement, may be delivered through the pipes 96 and 97 into the pipe 57 to supplement the anion exchanger regenerant from the cell 33. The electrolytic cell 10 of Figure 2 therefore provides a means of not only adjusting the pH of the partially demineralized effluent from cell 33 for a particular use requirement but also provides for supplying a high pH water to be directed first to a cation exchanger and thence to an anion exchanger or a low pH water to be directed first to an anion exchanger and thence to a cation exchanger in order to promote efficient use of the ion exchange materials. The modification employed will be dependent upon the mineral content of the supply water and the nature of the final water desired.

It is apparent that the cell 10 of Figure 2 can be omitted if pH adjustment is not required, in which case the system of this figure becomes the same as that of Figure 1 without prior softening of the water. The ion exchanger treatment contemplated with Figure 2 may also be omitted as well as pH adjustment in the cell 10, if the partly demineralized water is suitable for the desired use. This type of operation employing a demineralizing cell such as 33 either with or without a prior softening treatment has been mentioned with respect to Figure 1. As previously noted, when the influent to such a demineralizing cell is approximately neutral or only slightly alkaline, the normal tendency is for the treated water effluent to be of too low a pH to be suitable for most uses. By decreasing the volume of catholyte flowed through the cathode compartment 37 of the cell 33 and thereby increasing the hydroxyl ion concentration therein, hydroxyl anions move into the demineralizing compartment 36 in excess of hydrogen cations therein to increase the pH of the partly demineralized water discharged from the demineralizing compartment 36. It will be recognized, however, that this method of raising the pH of the treated water effluent to neutrality or to a slightly alkaline condition will be at the expense of some reduction in mineral cation removal and the extent to which such method can be practiced will be somewhat dependent upon the quality of the water desired. Increasing the volume of the anolyte flowed through the anode compartment 39, thereby decreasing the hydrogen ion concentration so that less hydrogen cations move into the demineralizing zone also has a tendency to raise the pH of the treated water effluent. This procedure, however, will tend toward production of an anolyte so dilute as to make it unsuitable as a cation exchanger regenerant and is therefore limited in extent as in the case of the catholyte pH adjustment. When all the partly demineralized water is to be put to direct use without further demineralization in cation exchangers, the anolyte from cell 36 may be discarded as a waste and pH adjustment by adjustment of anolyte flow may be extended, limited only by economic waste losses.

Figure 3 shows a water treating process employing an electrolytic water softening system in combination with a cation exchange system. Supply water from the supply pipe 22 containing an appreciable quantity of carbonate hardness is introduced into the cathode compartment 12 of a multiple-compartment electrolytic cell 102. The cell 102 may be the same as the cell 10 of Figures 1 and 2 except that it may have an additional permeable diaphragm 103 providing an additional compartment 104 adjacent the anode compartment 14. That is to say, the cell 104 may have the same buffer compartments 16 and 18 provided by the diaphragms 17, 41 and 19 which are present in the cell 10 as well as the additional diaphragm 103 and compartment 104. The water may be alkalized in the cathode compartment 12 to the desired precipitation point of the hardness ingredient and delivered through the pipe 23 to the clarifier 24. Clarified, softened water may be withdrawn from the clarifier 24. A portion of this alkaline water may be delivered to a desired use through a pipe 105, and another portion may be delivered to an ion exchange system through the pipe 31 and pipe 106 for reduction of such cations as sodium or potassium and returned through the pipe 107 to be blended with still another portion continuing in the pipe 31.

Since the anolyte from the electrolytic cell 102 in this case is to be used as regenerant in the cation exchangers 108 and 109, variations in anode compartment supply and discharge connections are provided in order to make allowance for variations in sulfate content of the supply water. For example, when the sulfate content is appreciably higher than the chloride content, the anode compartment 14 may be supplied through the pipe 111 connected to the pipe 31 containing substantially calcium-free water. The anolyte discharge may then be withdrawn through the pipe 112 and delivered through the storage tank 113 and pipe 114 to the ion exchange system for regeneration use. When the sulfate content is appreciably lower than the chloride content, the anode compartment 14 may be supplied through the pipe 26 connecting with the alkaline sludge discharge pipe 28 of the clarifier 24. The main flow of anolyte discharge is withdrawn from the compartment 104 through the pipe 116 and delivered through the storage tank 113 and the pipe 114 as the ion exchanger regenerant. An interconnecting aperture (not shown) in the diaphragm 103 may be required to maintain desired solution levels and the required anolyte outflow but usually and particularly when suitable synthetic fabrics are used as diaphragms, the seepage through the diaphragm will be sufficient and a high clarity anolyte will be obtained. In this arrangement a relatively small quantity of anolyte may be discharged from the anode compartment 14 through the pipe 117 and discarded as waste for eliminating undissolved particles and sediment introduced from the clarifier 24. With this later arrangement, one buffer compartment has been lost so far as buffer action is concerned, and for that reason the additional compartment 104 and additional diaphragm 103 have been shown in Figure 3. In this connection, it is pointed out that the number of buffer compartments employed in either the water softening cells or the demineralizing cells will vary with the nature of the water being treated and that of the desired treated water for maximum efficiency and that the number of buffer compartments in the cells illustrated in the drawing is merely by way of example.

The two cation exchangers 108 and 109 are provided so that one may be backwashed, regenerated and rinsed while the other is on the exhaustion cycle as discussed in connection with Figure 1. Thus backwash water may be supplied from the pipe 22 and pipe 118 and this water sent to waste through the pipe 119, rinse water being sent to waste through pipes 121 and 119. The treated water effluent from the ion exchangers, usually with a pH below 5, may be delivered through the pipe 106 into the pipe 31 to join the portion of alkaline water from the clarifier 24 which is conducted through the pipe 31 to form a blend of somewhat lower pH and total dissolved solids than that taken directly from the clarifier through the diversion line 105. A diversion pipe 122 may also be provided for withdrawal of all or a portion of the low pH effluent from the ion exchangers. The volume of anolyte produced by the electrolytic cell 102 which may be used as cation exchanger regenerant will vary with the amount of acid forming constituent in the raw water supplied. In general, this quantity will be less than 20% of the total influent of the electrolytic cell and since 100% regenerating efficiency is impossible, the quantity of water diverted to the ion exchanger system will, in general, be less than 20% of the clarified catholytic effluent. The value of the process then becomes primarily that of pH reduction for the alkaline soft water produced by the electrolytic cell 102 by blending with the water from the cation exchangers. There is, however, partial reduction of electrolytic content, since electrolyte is removed from water in both the cell 102 and the exchangers 108 and 109.

Raw or waste waters which it is necessary or desirable to subject to softening or demineralization vary widely in their electrolyte content and also the nature of the water desired for various uses varies widely. In some instances, it is merely necessary to soften the water while in other cases the water is originally soft but nevertheless requires reduction or elimination of dissolved electrolytes, and in still other cases it is necessary to both soften the water and remove or eliminate residual dissolved electrolyte. The present invention provides a process which is capable of economically treating raw or waste waters from substantially any source including hard and soft waters which may be relatively high in electrolyte content to produce a water suitable for substantially any desired use including uses for which the electrolyte content of the water must be substantially completely eliminated. This is accomplished by employing electrolytic treatment or a combination of such treatment with treatment with ion exchange materials in a unitary process, in which both types of treatment operate at maximum efficiency and the regenerating agents for the ion exchange materials are produced in the process such that purchase of such regenerating agents is obviated. In addition to this saving in the cost of regenerating chemicals the attrition loss of ion exchange materials is drastically reduced through the use of the electrolytically produced regenerants and the need for rinse water is markedly diminished. This application is a continuation in part of my copending application Serial No. 285,614, now abandoned, filed May 2, 1952, and of my copending application Serial No. 285,613, now abandoned, also filed May 2, 1952.

The details of the improved electrolytic cells contemplated herein are more fully disclosed in my copending application Serial No. 285,613, filed May 2, 1952. Such cells make it possible to produce usable regenerating agents from nearly any type of raw or waste water encountered and also more efficiently soften or reduce the electrolyte content of the water treated than do conventional types of 2 and 3 compartment cells.

While the use of the improved electrolytic cells of this invention is preferred in combined electrolytic and ion exchange processes, it is to be understood that the unitary demineralizing method of the invention may be practiced on certain waters while using conventional demineralizing cells.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The process of treating water which comprises, passing water containing dissolved electrolytes including hardness constituents as catholyte through the cathode compartment of an electrolytic cell divided by a plurality of permeable diaphragms into compartments including said cathode compartment, an anode compartment and a buffer compartment positioned between said anode and cathode compartments, maintaining a body of anolyte in said anode compartment, and passing direct electric current from an anode in said anode compartment through said buffer compartment to a cathode in said cathode compartment to cause said catholyte to become alkaline and said anolyte to become acidic while retarding back diffusion of cations and anions between said cathode and anode compartments by maintaining a substantially quiescent solution of electrolyte in said buffer compartment.

2. In a process of treating water in a direct current diaphragm type electrolytic cell having an anode compartment, a cathode compartment and a buffer compartment therebetween, the steps comprising: flowing water as catholyte through said cathode compartment, maintaining a body of anolyte in said anode compartment, and passing electric current from an anode in said anode compartment through said buffer compartment to a cathode in said cathode compartment to increase the alkalinity of said catholyte and to increase the acidity of said anolyte while retarding back diffusion of cations and anions between said cathode and anode compartments by maintaining a substantially quiescent body of electrolyte in said buffer compartment.

3. The process as defined in claim 2 in which acidic anolyte is withdrawn from said anode compartment and the anolyte is replenished with alkaline catholyte from said cathode compartment.

4. The process as defined in claim 3 in which the treated water discharged from the cathode compartment is clarified to remove therefrom as a sludge precipitated compounds and at least a portion of said sludge is delivered into said anode compartment as part of the alkaline catholyte replenishing said anolyte.

5. The process as defined in claim 2 in which the treated water discharged from the cathode compartments is subjected to further treatment to remove dissolved electrolyte and to adjust its pH.

6. In a process of treating water in a direct current diaphragm type electrolytic cell having an anode compartment, a cathode compartment, a deionizing compartment therebetween and at least one buffer compartment between said anode and cathode compartments, the steps comprising: flowing water through said deionizing compartment, maintaining a body of anolyte in said anode compartment and a body of catholyte in said cathode compartment, and passing electric current from an anode positioned in said anode compartment through said buffer compartment and said deionizing compartment to a cathode in said cathode compartment to cause migration of ions out of said deionizing compartment and to increase the alkalinity of said catholyte and the acidity of said anolyte while retarding back diffusion from said anode and cathode compartments by maintaining a substantially quiescent solution of electrolyte in said buffer compartment.

7. In a process of treating water in a direct current diaphragm type electrolytic cell having an anode compartment and a cathode compartment, the steps comprising: subjecting said water to electrolytic treatment in a deionizing compartment between said anode and cathode compartments to reduce the dissolved electrolyte content of said water while retarding back diffusion from said anode and cathode compartments by maintaining between permeable diaphragms in said cell at least one substantially quiescent body of electrolyte located between said anode and cathode compartments, thereafter subjecting the partly deionized water to ion exchange treatment by contacting the same with at least one ion exchange material, and employing an effluent from at least one compartment of said cell other than said deionizing compartment to regenerate said ion exchange material.

8. In a process of treating water in a direct current diaphragm type electrolytic cell having an anode compartment and a cathode compartment, the steps comprising: subjecting said water to electrolytic treatment in a deionizing compartment between said anode and cathode compartments to reduce the dissolved electrolyte content of said water while retarding back diffusion from said anode and cathode compartments by maintaining between permeable diaphragms in said cell at least one substantially quiescent body of electrolyte located between said anode and cathode compartments and said deionizing compartment, thereafter subjecting partly deionized water to cation exchange treatment by contacting the same with a cation exchange resin, withdrawing acid water from a compartment of said cell on the anode side of said deionizing compartment, and regenerating said cation exchange resin with said acid water.

9. In a process of treating water in a direct current diaphragm type electrolytic cell having an anode compartment and a cathode compartment, the steps comprising: subjecting said water to electrolytic treatment in a deionizing compartment between said anode and cathode compartments to reduce the dissolved electrolyte content of said water while retarding back diffusion from said anode and cathode compartments by maintaining between permeable diaphragms in said cell at least one substantially quiescent body of electrolyte located between said anode and cathode compartments and said deionizing compartment, thereafter subjecting partly deionized water to anion exchange treatment by contacting the same with an anion exchange resin, withdrawing alkaline water from a compartment of said cell on the cathode side of said deionizing compartment, and regenerating said anion exchange resin with said alkaline water.

10. In a process of treating water in a direct current diaphragm type electrolytic cell having an anode compartment and a cathode compartment, the steps comprising: subjecting said water to electrolytic treatment in a deionizing compartment between said anode and cathode compartments to reduce the dissolved electrolyte content of said water while retarding back diffusion from said anode and cathode compartments by maintaining between permeable diaphragms in said cell at least one substantially quiescent body of electrolyte located between said anode and cathode compartments and said deionizing compartment, thereafter subjecting partly deionized water to both cation and anion exchange treatment by contacting the same with a cation exchange resin and an anion exchange resin, withdrawing acid water from a compartment of said cell on the anode side of said deionizing compartment, withdrawing alkaline water from a compartment of said cell on the cathode side of said deionizing compartment, regenerating said cation exchange resin with said acid water, and regenerating said anion exchange resin with said alkaline water.

11. In a process of treating water in a direct current diaphragm type electrolytic cell having an anode compartment, a cathode compartment and a buffer compartment therebetween, the steps comprising: flowing water as catholyte through said cathode compartment, maintaining a body of anolyte in said anode compartment, maintaining a substantially quiescent body of electrolyte in said buffer compartment, passing electric current from an anode in said anode compartment through said buffer compartment to a cathode in said cathode compartment to increase the alkalinity of said catholyte and to increase the acidity of said anolyte, thereafter subjecting the treated water from said cathode compartment to cation exchange treatment by contacting the same with a cation exchange resin, withdrawing acid water from a compartment in said cell between said anode and cathode compartments and adjacent the anode compartment, and regenerating said cation exchange resin with said acid water.

12. The process of treating water, which comprises, passing water containing dissolved electrolytes including hardness constituents as the catholyte through the cathode compartment of a first electrolytic cell having at least a cathode compartment and an anode compartment, passing an aqueous electrolyte through said anode compartment, passing direct current from an anode positioned in said anode compartment to a cathode positioned in said cathode compartment to cause said catholyte to become alkaline and said anolyte to become acidic, clarifying the effluent from said cathode compartment, passing at least a portion of said clarified effluent through a demineralizing compartment of a second electrolytic cell having a cathode compartment and an anode compartment on opposite sides of said demineralizing compartment, passing an aqueous electrolyte through said anode compartment of said second cell, passing an aqueous catholyte through said cathode compartment of said second cell, passing a direct electric current between an anode positioned in said anode compartment of said second cell and a cathode positioned in said cathode compartment of said second cell and through said demineralizing compartment, discharging an acidic anolyte from said anode compartment of said second cell, discharging an alkaline catholyte from the cathode compartment of said second cell, discharging a partly demineralized water from said demineralizing compartment, retarding back diffusion from said anode and cathode compartments to the demineralizing compartment of said second cell by maintaining between permeable diaphragms in said second cell at least one substantially quiescent body of electrolyte located between said anode and cathode compartments and said demineralizing compartment, subjecting said partly demineralized water to ion exchange treatment with cation and anion exchange resins and regenerating said cation exchange resin with the acidic anolyte discharged from the anode compartment of said second cell and regenerating said anion exchange resin with the alkaline catholyte discharged from the cathode compartment of said second cell.

13. The process of treating water, which comprises passing water containing dissolved electrolyte including hardness constituents as the catholyte through the cathode compartment of an electrolytic cell divided by a plurality of permeable diaphragms into compartments including said cathode compartment, an anode compartment and a buffer compartment positioned between said anode and cathode compartments, maintaining a body of anolyte in said anode compartment and a quiescent solution of electrolyte in said buffer compartment, passing a direct electric current from an anode positioned in said anode compartment through said buffer compartment to a cathode positioned in said cathode compartment to cause said catholyte to become alkaline, said anolyte to become acidic, and said electrolyte in said buffer compartment to consist of at least some of the ions found in said water to be treated and ions formed electrolytically in said cell, said buffer compartment restricting diffusion of acid anolyte from said anode compartment into said cathode compartment, whereby an anolyte of increased acidity may be maintained in said anode compartment and sufficient alkalinity of said catholyte to precipitate compounds of said hardness constituents insoluble in the alkaline catholyte is more efficiently attained in said cathode compartment and softened water is discharged from said cathode compartment, clarifying the softened water discharged from said cathode compartment to remove therefrom precipitated compounds of said hardness constituents and produce a softened water still containing dissolved electrolyte, passing said clarified water through a demineralizing compartment of a second electrolytic cell divided by a plurality of permeable diaphragms into compartments including said demineralizing compartment, an anode compartment on one side of said demineralizing compartment and a cathode compartment on the other side of said demineralizing compartment, passing an aqueous anolyte through said anode compartment of said second cell, passing an aqueous catholyte through said cathode compartment of said second cell, and passing a direct electric current between an anode positioned in said anode compartment of said second cell and a cathode positioned in said cathode compartment of said second cell and through said demineralizing compartment while retarding back diffusion from said anode and cathode compartments into said demineralizing compartment by maintaining between permeable diaphragms in said second cell at least one substantially quiescent body of electrolyte located between said anode and cathode compartments and said demineralizing compartment whereby dissolved electrolyte is removed by ion migration from the water passed through said demineralizing compartment, an acidic anolyte is discharged from said anode compartment of said second cell, an alkaline catholyte is discharged from the cathode compartment of said second cell, and a partly demineralized water is discharged from said demineralizing compartment.

14. The process as defined in claim 13, comprising the further steps of subjecting at least a portion of the partly demineralized water discharged from said demineralizing compartment to ion exchange treatment with active cation and anion exchange resins to exhaust said resins and remove additional dissolved electrolyte from said partly demineralized water, regenerating the exhausted anion exchange resin with the alkaline catholyte discharged from the cathode compartment of said second cell, and regenerating the exhausted cation exchange resin with the acidic anolyte discharged from the anode compartment of said second cell.

15. The process as defined in claim 14, comprising the additional step of blending water which has been subjected to said treatment with exchange resins with at least a portion of the water discharged from said demineralizing compartment of said second cell.

16. The process as defined in claim 13, comprising the steps of subjecting at least a portion of the partly demineralized water from said demineralizing compartment to cation exchange treatment with a cation exchange resin to exhaust said resin and remove additional electrolyte therefrom to produce an acidic water, regenerating the exhausted cation exchange resin with the acid anolyte from the anode compartment of said second cell and blending said acid water with clarified alkaline softened water from the cathode compartment of said first cell.

17. The process as defined in claim 16, comprising the additional step of blending said acid water with at least a portion of said partly demineralized water from the demineralizing compartment of said second cell.

18. The process of treating water, which comprises, passing soft water containing dissolved electrolyte through a demineralizing compartment of an electrolytic cell divided by a plurality of permeable diaphragms into compartments including said demineralizing compartment, an anode compartment on one side of said demineralizing compartment, a cathode compartment on the other side of said demineralizing compartment, at least one buffer compartment between said anode compartment and said demineralizing compartment and at least one buffer compartment between said cathode compartment and said demineralizing compartment, passing an aqueous anolyte through said anode compartment, passing an aqueous catholyte through said cathode compartments, and passing a direct electric current between an anode positioned in said anode compartment and a cathode positioned in said cathode compartment and through said buffer and demineralizing compartments while retarding back diffusion from said anode compartment and said cathode compartment into said demineralizing compartment by maintaining substantially quiescent solutions of electrolyte in said buffer compartments, whereby dissolved electrolyte is removed by ion migration from the water passed through said demineralizing compartment, an acid anolyte of increased acidity is discharged from said anode compartment, an alkaline catholyte of increased alkalinity is discharged from said cathode compartment, said electrolyte in said buffer compartment consists of at least some of the ions found in said water to be treated and ions formed electrolytically in said cell, and a partly demineralized water is discharged from said demineralizing compartment.

19. The process as defined in claim 18, in which the water to be treated is originally a hard water and is subjected to water softening treatment prior to being passed through said demineralizing compartment.

20. The process as defined in claim 18, in which the partly demineralized water discharged from said demineralizing compartment is passed through one of the electrode compartments of another electrolytic cell of the permeable diaphragm type having an anode compartment and a cathode compartment, a body of aqueous electrolyte is maintained in the other electrode compartment, and a direct electric current is passed between an anode in said anode compartment and a cathode in said cathode compartment to adjust the pH of the partly demineralized water discharged from said electrode compartment.

21. The process as defined in claim 20, comprising subjecting the partly demineralized water discharged from an electrode compartment of said other cell to ion exchange treatment with active cation and anion exchange resins to exhaust said resins and remove additional dissolved electrolyte from said partly demineralized water and regenerating the exhausted anion exchange resin with the alkaline catholyte discharged from the cathode compartment of the first-mentioned cell and regenerating the exhausted cation exchange with the acidic anolyte discharged from the anode compartment of the first-mentioned cell.

22. The process of treating water, which comprises, passing soft water containing dissolved electrolyte through a demineralizing compartment of an electrolytic cell divided by a plurality of permeable diaphragms into compartments including said demineralizing compartment, an anode compartment on one side of said demineralizing compartment, a cathode compartment on the other side of said demineralizing compartment, passing an aqueous anolyte through said anode compartment, passing an aqueous catholyte through said cathode compartments, passing a direct electric current between an anode positioned in said anode compartment and a cathode positioned in said cathode compartment and through said demineralizing compartments, whereby dissolved electrolyte is removed by ion migration from the water passed through said demineralizing compartment, an acid anolyte is discharged from said anode compartment, an alkaline catholyte is discharged from said cathode compartment and a partly demineralized water is discharged from said demineralizing compartment, retarding back diffusion from said anode and cathode compartments into said demineralizing compartment by maintaining between permeable diaphragms in said cell at least one substantially quiescent body of electrolyte located between said anode and cathode compartments and said demineralizing compartment, subjecting partly demineralized water discharged from said demineralizing compartment to ion exchange treatment with active cation and anion exchange resins to exhaust said resins and remove additional dissolved electrolyte from said partly demineralized water, regenerating the exhausted anion exchange resin with alkaline catholyte discharged from the cathode compartment of said cell and regenerating regenerating the exhausted cation exchange resin with the acidic anolyte discharged from the anode compartment of said cell.

23. The process of treating water which comprises: passing water containing dissolved electrolytes including hardness constituents as a catholyte through the cathode compartment of an electrolytic cell having a cathode compartment, an anode compartment, and at least one buffer compartment therebetween; passing an aqueous electrolyte through said anode compartment; maintaining a substantially quiescent body of electrolyte in said buffer compartment; passing electric current from an anode in said anode compartment through said buffer compartment to a cathode in said cathode compartment to increase the alkalinity of said catholyte and to increase the acidity of said anolyte; clarifying the effluent from said cathode compartment; passing at least a portion of said clarified effluent to said anode compartment as anolyte feed; subjecting another portion of said clarified cathode effluent to cation exchange treatment by contacting the same with a cation exchange resin; withdrawing acid water from said anode compartment; and regenerating said cation exchange resin with said acid water.

References Cited in the file of this patent

UNITED STATES PATENTS

| | | |
|---|---|---|
| 1,840,105 | Kean | Jan. 5, 1932 |
| 1,986,920 | Cross | Jan. 8, 1935 |
| 2,057,232 | Endell | Oct. 13, 1936 |
| 2,277,091 | Feyens | Mar. 24, 1942 |
| 2,502,614 | Zender | Apr. 4, 1950 |
| 2,535,035 | Briggs | Dec. 26, 1950 |